US009604522B2

(12) United States Patent
Geissenhoener

(10) Patent No.: US 9,604,522 B2
(45) Date of Patent: Mar. 28, 2017

(54) METHOD FOR THE REMOTE ACTIVATION OF A FUNCTION OF A MOTOR VEHICLE AND COMPUTER PROGRAM PRODUCT

(71) Applicant: AUDI AG, Ingolstadt (DE)

(72) Inventor: Martin Geissenhoener, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 14/898,625

(22) PCT Filed: Jun. 17, 2014

(86) PCT No.: PCT/EP2014/001639
§ 371 (c)(1),
(2) Date: Dec. 15, 2015

(87) PCT Pub. No.: WO2014/202204
PCT Pub. Date: Dec. 24, 2014

(65) Prior Publication Data
US 2016/0114649 A1    Apr. 28, 2016

(30) Foreign Application Priority Data

Jun. 21, 2013   (DE) .................. 10 2013 010 449

(51) Int. Cl.
*B60H 1/00*   (2006.01)
*B60H 1/32*   (2006.01)
*G08C 17/02*  (2006.01)

(52) U.S. Cl.
CPC ..... *B60H 1/00657* (2013.01); *B60H 1/00771* (2013.01); *B60H 1/32* (2013.01); *G08C 17/02* (2013.01); *G08C 2201/51* (2013.01)

(58) Field of Classification Search
CPC .. B60H 1/00657; B60H 1/00771; B60H 1/32; G08C 17/02; G08C 2201/51
(Continued)

(56) References Cited

U.S. PATENT DOCUMENTS 7,055,340 B2   6/2006   Umebayashi et al.
8,370,020 B2   2/2013   Bauman et al.
(Continued)

FOREIGN PATENT DOCUMENTS

CN    102448748 A    5/2012
CN    102458920 A    5/2012
(Continued)

OTHER PUBLICATIONS

German Office Action for German Priority Patent Application No. 10 2013 010 449.1, issued Jul. 18, 2014, 5 pages.
(Continued)

*Primary Examiner* — Tyler J Lee
(74) *Attorney, Agent, or Firm* — Staas & Halsey LLP

(57) ABSTRACT

A method remotely activates an air-conditioning function of a motor vehicle by a mobile communication device. This involves transmitting an activation signal by a mobile communication device to a receiver device of the motor vehicle, receiving the activation signal by the receiver device of the motor vehicle, determining a current location by a location-determining device of the motor vehicle, transferring information about the determined location from the motor vehicle to the mobile communication device, and activating the air-conditioning function of the motor vehicle if the receiver device has received a confirmation signal transmitted by the mobile communication device.

13 Claims, 1 Drawing Sheet

(58) Field of Classification Search
USPC .......................................................... 701/36
See application file for complete search history.

(56) References Cited

U.S. PATENT DOCUMENTS

| | | | | |
|---|---|---|---|---|
| 9,132,715 | B2* | 9/2015 | Kalhous | B60H 1/00657 |
| | | | | 709/202 |
| 9,283,827 | B2* | 3/2016 | Nishida | B60H 1/00771 |
| 2002/0109583 | A1 | 8/2002 | Losey | |
| 2003/0098909 | A1 | 5/2003 | Fritzsche et al. | |
| 2012/0112694 | A1 | 5/2012 | Frisch et al. | |
| 2012/0130604 | A1 | 5/2012 | Kirshon et al. | |
| 2012/0282913 | A1 | 11/2012 | Kaindl et al. | |
| 2013/0151037 | A1 | 6/2013 | Harumoto et al. | |
| 2014/0074320 | A1* | 3/2014 | Nishida | B60R 16/0232 |
| | | | | 701/2 |
| 2014/0081481 | A1* | 3/2014 | Nishida | B60H 1/00771 |
| | | | | 701/2 |

FOREIGN PATENT DOCUMENTS

| | | |
|---|---|---|
| DE | 10107280 | 9/2002 |
| DE | 102004004302 | 8/2004 |
| DE | 102007001660 | 7/2008 |
| DE | 102008022771 | 12/2008 |
| DE | 102007050308 | 4/2009 |
| DE | 102007057216 | 6/2009 |
| DE | 102008034606 | 1/2010 |
| DE | 102009019753 | 11/2010 |
| DE | 102009038431 | 2/2011 |
| DE | 102009058095 | 6/2011 |
| DE | 102010006149 | 8/2011 |
| DE | 102012014478 | 1/2013 |
| DE | 10 2013 010 449.1 | 6/2013 |
| EP | 1020309 | 7/2000 |
| EP | 2688267 | 1/2014 |
| JP | 2002-264635 A | 9/2002 |
| WO | PCT/EP2014/001639 | 6/2014 |

OTHER PUBLICATIONS

The International Search Report for PCT/EP2014/001639, mailed on Sep. 17, 2014, 2 pages.
WIPO translation of PCT International Preliminary Report on Patentability dated Dec. 23, 2015 in corresponding International Patent Application No. PCT/EP2014/001639.
Office Action mailed Mar. 23, 2016 in Chinese Patent Application No. 201480019135.0.

* cited by examiner

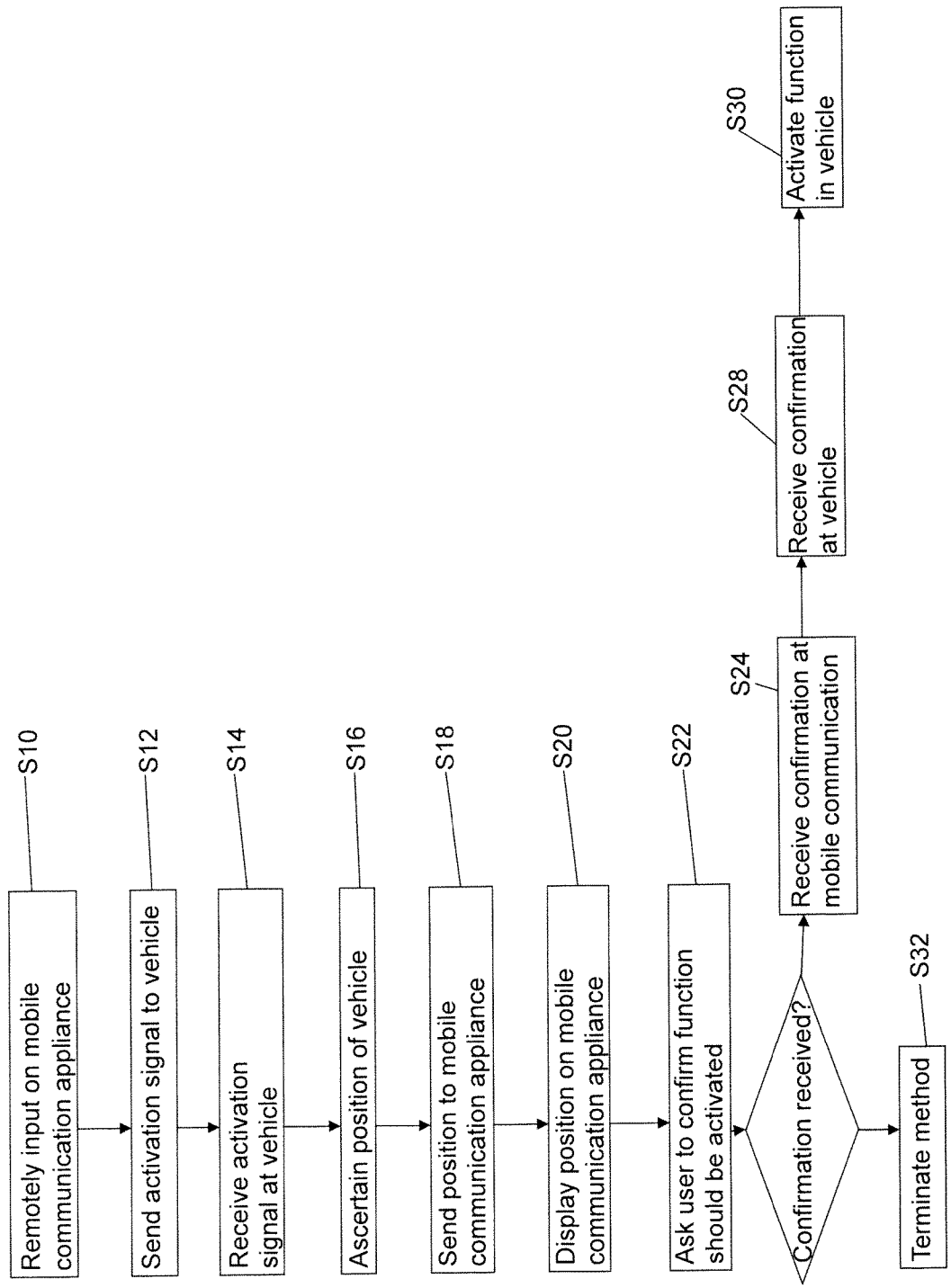

METHOD FOR THE REMOTE ACTIVATION OF A FUNCTION OF A MOTOR VEHICLE AND COMPUTER PROGRAM PRODUCT

CROSS REFERENCE TO RELATED APPLICATIONS

This application is based on and hereby claims priority to International Application No. PCT/EP2014/001639 filed on Jun. 17, 2014 and German Application No. 10 2013 010 449.1 filed on Jun. 21, 2013, the contents of which are hereby incorporated by reference.

BACKGROUND

The invention relates to a method for remote activation of an air-conditioning function of a motor vehicle and to a computer program product that can be executed on a mobile communication appliance.

For vehicles with remote starting, i.e. those in which the engine can be started by radio remote control or an app, for example in order to air-condition the vehicle in advance, it is necessary to ensure that the vehicle is in a safe environment at the time. By way of example, remote starting would be particularly safety-critical if the vehicle were in a closed space, such as a garage, since the resultant exhaust gases mean that the health of persons entering the garage is damaged.

DE 10 2012 014 478 A1 describes a method for starting an engine of a vehicle by transmitting a start signal to a communication unit that is present in the vehicle using a mobile communication unit. This involves ascertaining a condition of the environment of the vehicle beforehand and starting the engine of the basis of the ascertained condition of the environment. In this case, the vehicle comprises a sensor system that can be used to determine the $CO_2$ concentration of the environment, for example, or to establish whether the vehicle is in a closed space and what is the volume of this space. The sensors provided in this case may be cameras or ultrasonic sensors. It is also possible to take account of information that is known from data sources, e.g. via mobile internet, on the basis of a known position. By way of example, loss of GPS reception together with slow travel allows entry into a sheltered garage to be detected. The distance traveled after the loss of GPS reception, e.g. ascertained by the wheel rotation sensors, can be converted into a minimum space volume, or the navigation database can be used to ascertain parking garages or garages on the basis of position.

Such a method is relatively elaborate, however, particularly as far as the measurement and computation effort is concerned. In addition, such methods are also relatively inaccurate and are based on estimates, such as the determination of the minimum volume. Resorting to a navigation database is also unsatisfactory, since usually not all parking garages and above all not all garages or other closed spaces are stored in such a navigation database.

Further methods known from the related art provide for the remote start running time of the engine to be limited, particularly to very short running times, such as a maximum of 10 minutes, and for such remote starting to be permitted only a maximum of twice per idle phase of the motor vehicle. However, this restricts the air-conditioning comfort to an extreme degree, since the short remote start running times mean that desired target temperatures are reached only rarely.

SUMMARY

It is one potential object to provide a method for remote activation of an air-conditioning function of a motor vehicle and a computer program product that can be executed on a mobile communication appliance that allow remote activation of an air-conditioning function simply and safely.

The inventor proposes a method for remote activation of an air-conditioning function of a motor vehicle by a mobile communication appliance comprises:

a) sending of an activation signal to a reception device of the motor vehicle by a mobile communication appliance;

b) reception of the activation signal by the reception device of the motor vehicle;

c) ascertainment of a current position by a position finding device of the motor vehicle;

d) transmission of a piece of information about the ascertained position from the motor vehicle to the mobile communication appliance; and e) activation of the air-conditioning function of the motor vehicle if the reception device has received a confirmation signal sent by the mobile communication appliance.

In this context, the air-conditioning function is intended to be understood to mean particularly a function of the motor vehicle that brings about heating and/or cooling of the motor vehicle, or of just one area of the motor vehicle, such as the interior, the passenger compartment and/or the trunk, and/or of other subareas of the motor vehicle. By way of example, the activation of the air-conditioning function may be activation of the air-conditioning system and/or of the independent heater of the motor vehicle.

By virtue of the proposed method, the air-conditioning function is thus not activated immediately when the reception device has received the activation signal, but rather activation of the function requires further reception of a confirmation signal, which allows an increase in safety for remote activation of the function. In addition, there is particular provision for the information about the position of the motor vehicle to be able to be transmitted to the mobile communication appliance before a confirmation signal can be sent from the mobile communication appliance. This thus allows the user to be informed of the current position of the motor vehicle before the air-conditioning function is activated. Dangerous situations that can result from the motor vehicle being reparked by another user can thus be countered. This is because the user can discover that the motor vehicle has been reparked on the basis of the information transmitted to the mobile communication appliance about the position.

Furthermore, there is thus also provision for the user to be able to prevent or terminate activation of the air-conditioning function. The transmitted position information means that the user is additionally himself able to assess whether the position of the vehicle is a safe environment. By way of example, if a user sees that the current position corresponds to the position at which he himself parked the motor vehicle, then the user can himself assess whether this is a safe environment for activating a function of the vehicle. Inadvertent activation of a function can also be prevented in this manner, particularly by virtue of a one-off transmission of an activation signal not being sufficient to activate the function, but rather a second confirmation signal being required before the function can be activated. Overall, this method can also be implemented particularly simply and with very little technical effort, since there is no need for elaborate or complex sensor systems to be provided and there is also no need to make elaborate computation efforts in order to be able to establish the condition of the environment of the motor vehicle. Above all, safety risks owing to technical misinterpretations in relation to a safe environment can likewise be ruled out or at least reduced in this manner. The user can thus advantageously be involved in the safety assessment as well. The great advantage of the method is that this allows the knowledge of a user about the environment in which he parked the motor vehicle or in which the vehicle is parked to be used in order to allow the user to make a, if need be additional, risk assessment. Alternatively, further safety criteria can also be provided, it also being possible for the sending of the confirmation signal to be dependent on the satisfaction of further safety criteria, in particular.

In particular, the reception device of the motor vehicle is intended to be understood to be part of a communication device that is designed to communicate with the mobile communication appliance wirelessly, in particular bidirectionally. For the purpose of transmitting the information about the ascertained position from the motor vehicle to the mobile communication appliance, there may then be provision for a transmission device, which can likewise be part of the communication device of the motor vehicle. The communication link between the mobile communication appliance and the communication device of the motor vehicle for wireless communication between these two entities can be provided by a mobile radio network, for example. In this case, such a communication link is not subject to any restrictions in respect of its range and is therefore particularly advantageous. Furthermore, the mobile communication appliance may be a cell phone, a Smartphone or else a tablet PC, laptop, PDA or the like. In addition, a position finding device can be understood to mean a GPS appliance or a GPS receiver, for example. Other appliances for receiving position data, particularly using satellite-based systems, may also be provided as a position finding device.

Furthermore, the activation signal and the confirmation signal can be regarded as two different signals that are distinguished particularly by virtue of their information content. In this case, the reception device is particularly designed to distinguish the activation signal and the confirmation signal, for example using their information content. Reception of the activation signal is preferably a prerequisite and an indirect or direct trigger for transmission of the information about the position of the motor vehicle in this case. Reception of the confirmation signal by the reception device is preferably a prerequisite and/or trigger for activation of the function of the motor vehicle.

In one advantageous refinement, the piece of information transmitted to the mobile communication appliance about the ascertained position of the motor vehicle is displayed by the mobile communication appliance on a display device of the mobile communication appliance. In particular, a piece of information about the ascertained position can be understood to mean (Geo) coordinates of the position. In this case, the display can be provided in audible form, such as that of a voice output, and/or also in visual form. Of particular advantage in this case is a display in the form of image data, for example as a representation of the position of the motor vehicle on a geographic map and/or a road map. This allows a user to be notified of the position of the motor vehicle in a manner that is particularly easy to grasp.

In a further advantageous refinement, part d) and reception of the transmitted piece of information about the ascertained position by the communication appliance are followed by the latter outputting a confirmation request to the user. In this case, this confirmation request may be a request for confirmation of the activation of the function and/or for confirmation that the motor vehicle is in a safe environment and/or in the open air and/or not in a closed space and/or confirmation that the user has parked the motor vehicle at the displayed position. The locating information, which is provided as information from the position of the motor vehicle, together with this confirmation request allows a user to be alerted to possible dangers and/or risks, for example to the fact that the motor vehicle has been reparked by another person or is even currently being used, or that it has been parked in the garage, etc. The user therefore makes a conscious decision in light of the position of the motor vehicle as to whether or not the function needs or is able to be activated.

In a further advantageous refinement, the mobile communication appliance sends the confirmation signal to the motor vehicle in the event of input of confirmation by the user using the mobile communication appliance. The required input of confirmation can therefore ensure that the user is aware of the current position of the motor vehicle, which reduces safety risks for remote activation.

Furthermore, the function can be activated by switching on an internal combustion engine of the motor vehicle. Since dangerous situations can arise specifically upon remote activation of air-conditioning functions, which require the internal combustion engine to be switched on, such as activation of the air-conditioning system in order to bring the motor vehicle to temperature, the method described is particularly advantageous specifically for activation of such functions on account of its high level of safety. In addition, the function to be activated may also be activation of the independent heater for heating the motor vehicle. In this case, the internal combustion engine of the motor vehicle does not need to be switched on, but operation of the independent heater also results in exhaust gases that are harmful to health and can likewise harbor health and safety risks if the independent heater is operated in a closed space. The opportunity that the method provides for the user to easily establish whether the motor vehicle is in a closed space allows safety risks to be avoided in this case too.

Furthermore, the method also allows such functions also to be activated for a sufficiently long time, particularly until the motor vehicle is sufficiently air-conditioned or remains air-conditioned up to a time of use. The confirmation request to the user and input of confirmation thereby makes it possible to ensure that the vehicle is in a sufficiently safe environment for the activated function to be left activated without risk even for a relatively long time.

Furthermore, there may also be provision that activation of the function is followed by the internal combustion engine being switched on for a prescribed period and the function being performed for the prescribed period. This is particularly advantageous for a function for air-conditioning the automobile. Furthermore, a prescribed period may also be provided after which the function is automatically deactivated again and, in particular, the internal combustion engine is switched off again. This can prevent unnecessary fuel consumption, for example if a user has changed his mind and does not wish to use the vehicle and has then forgotten that he has activated a function remotely. The prescribed period for automatic shutdown may be much longer in this case than is customary in the prior art, particularly long enough for sufficient air-conditioning of the motor vehicle to be possible during this period even at extreme outside temperatures. As an alternative or in addition to the provision of a prescribed period prior to automatic shutdown of the internal combustion engine or deactivation of the function, provision may also be made for the mobile communication appliance to output a reminder signal, for example an audible signal, such as a warning tone, if the motor vehicle has not been used within a predetermined period. Furthermore, it is no longer necessary to provide limitations for safety reasons as far as the frequency of remote activation of a function during an idle phase is concerned. By way of example, provision may be made for remote activation of one or else more functions of a motor vehicle to be able to be activated as often as desired during an idle phase, i.e. without the motor vehicle being moved and/or driven and/or opened and/or used in any other way in the meantime. This advantageously allows restrictions imposed on the user for safety reasons to be reduced or else eliminated completely, and at the same time safe remote activation of a function to be made possible.

The inventor also proposes a computer program product (computer readable storage medium) that can be executed on a mobile communication appliance, when executed on a mobile communication appliance for the purpose of activating an air-conditioning function of a motor vehicle, prompts the mobile communication appliance to send an activation signal for requesting a piece of information about a position of the motor vehicle to a reception device of the motor vehicle and, when the requested piece of information about the position of the motor vehicle is received, to take satisfaction of a predetermined criterion for the position as a basis for sending a confirmation signal for activating the air-conditioning function to the reception device of the motor vehicle.

In this case, the predetermined criterion of the position may be that the user has himself parked the motor vehicle at this position or that the position is safe for the function that is to be activated or merely that the user has knowledge of the position of the motor vehicle. The satisfaction of these possible criteria can be confirmed by a user input on the mobile communication appliance, for example.

In this case, the predetermined criterion may be an input that is required from a user and/or may also be the satisfaction of further safety criteria, which can also relate to the position information from the motor vehicle, for example.

In particular, the computer program product may be designed to prompt the mobile communication appliance to carry out the method that has been described in connection with the proposed method and the possible refinements thereof and that are performed by the mobile communication appliance.

When executed on the mobile communication appliance, the computer program product, which may be embodied as an app or application that can be installed on a mobile communication appliance, for example, therefore allows remote activation of an air-conditioning function of a motor vehicle on the basis of the proposed method and the refinements thereof in a particularly advantageous manner.

All features, refinements and advantages thereof that have been described in connection with the method also apply in the same manner, where feasible, to the computer program product.

The features and combinations of features that are cited in the description above and the features and combinations of features that are cited in the description of the FIGURES below or in the FIGURES alone can be used not only in the respectively indicated combination but also in other combinations or on their own without departing from the scope of the proposals.

BRIEF DESCRIPTION OF THE DRAWINGS

These and other objects and advantages of the present invention will become more apparent and more readily appreciated from the following description of the preferred embodiments, taken in conjunction with the accompanying drawing of which:

The single FIGURE shows a flowchart for an exemplary embodiment of the proposed method for remote activation of a function of a motor vehicle.

DETAILED DESCRIPTION OF THE PREFERRED EMBODIMENT

Reference will now be made in detail to the preferred embodiments of the present invention, examples of which are illustrated in the accompanying drawing, wherein like reference numerals refer to like elements throughout.

In the flowchart shown in the single FIGURE, the proposed method is exhibited. If a user wishes to use his motor vehicle soon and, by way of example, to air-condition the motor vehicle beforehand, e.g. to heat it or cool it, remotely, then he can use an appropriate input on a mobile communication appliance in S10 to prompt the sending of an activation signal to the motor vehicle by the mobile communication appliance in S12 in order to activate the relevant function. In this case, the mobile communication appliance may be a Smartphone, a cell phone, a laptop, PDA, tablet PC, etc. and preferably has a display, audio output options and/or also audio input options and/or other input options, such as keys, a touch screen, etc.

When this activation signal is received by a reception device of the motor vehicle in S14, the position of the motor vehicle is ascertained by a position finding device of the motor vehicle in S16 and is sent to the mobile communication appliance in S18. By way of example, the position finding device may be in the form of a GPS appliance or in the form of a GPS receiver or else in the form of another appliance or system for position finding. The position may also have already been ascertained beforehand in this case. By way of example, provision may also be made for the position of the motor vehicle to be ascertained and stored whenever a journey ends. When the activation signal is then received by the reception device of the motor vehicle, the stored current position can then be transmitted to the mobile communication appliance. In this case, the communication between the motor vehicle and the mobile communication appliance can be effected via a mobile radio network, for example. Once the information, particularly the geographical information or position information, about the position of the motor vehicle has been transmitted to the mobile communication appliance, the position of the motor vehicle is displayed to the user on a display device of the mobile communication appliance in S20. This display can be provided in the form of a representation of the position of the motor vehicle on a map. The user therefore now sees where the motor vehicle is situated. If it is situated at a location at which he himself parked it, the user can assess whether the environment of this location is suitable for allowing the function to be activated without risk. Thus, a check can then be performed in S22 to determine whether the user wishes to activate the function on the basis of the position information that is now communicated to him, or the mobile communication appliance can output a confirmation request to the user that demands confirmation from the user before the function can be activated. If this confirmation is provided by the user in S24, for example by virtue of an input as required for confirmation using the mobile communication appliance, the mobile communication appliance sends a confirmation signal to the motor vehicle. When this confirmation signal is received by the reception device of the motor vehicle in S28, a control device of the motor vehicle prompts activation of the function in S30.

If the confirmation is withheld by the user in S24, the method is terminated in S32. By way of example, this may be the case if, on the basis of the information transmitted to him on the mobile communication appliance about the position of the motor vehicle, the user establishes that he has not himself parked the motor vehicle at that location and therefore does not know whether the environment of this location is safe for activation of the function. Alternatively, he establishes that the motor vehicle has been parked, whether by himself or by a further user, in a garage. The user can therefore prevent activation of the function and avoid safety risks. To terminate the method, provision may also be made, by way of example, for the user to make a termination input on the mobile communication appliance, whereupon a termination signal is transmitted to the motor vehicle and the motor vehicle prompts termination of the method and hence does not bring about activation of the function. Provision may also be made for termination of the method not to require an input by the user and for the method to be terminated automatically, for example, if a confirmation signal is not received by the reception device of the motor vehicle after a predetermined period.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in Superguide v. DIRECTV, 69 USPQ2d 1865 (Fed. Cir. 2004).

The invention claimed is:

1. A method for remote activation of an air-conditioning function of a motor vehicle, comprising:
   sending an activation signal to a reception device of the motor vehicle from a mobile communication appliance, the reception device being part of a communication device that communicates with the mobile communication appliance wirelessly;
   receiving the activation signal by the reception device of the motor vehicle;
   ascertaining a current position of the motor vehicle by a position finding device of the motor vehicle;
   after receiving the activation signal by the reception device, transmitting a piece of information about the current position of the motor vehicle, the piece of information being transmitted from the motor vehicle to the mobile communication appliance;
   displaying the current position of the motor vehicle to a user on a display device of the mobile communication appliance; and
   activating the air-conditioning function of the motor vehicle if the reception device has received a confirmation signal sent by the mobile communication appliance, the confirmation signal being different from the activation signal.

2. The method as claimed in claim 1, wherein
after the piece of information is received by the mobile communication appliance, the mobile communication appliance outputs a confirmation request to the user.

3. The method as claimed in claim 1, wherein
inputting confirmation by the user on the mobile communication appliance prompts the mobile communication appliance to send the confirmation signal to the motor vehicle.

4. The method as claimed in claim 1, wherein
the air-conditioning function is activated by switching on an internal combustion engine of the motor vehicle.

5. The method as claimed in claim 4, wherein
activation of the air-conditioning function is followed by the internal combustion engine remaining switched on for a prescribed period and the air-conditioning function being performed for the prescribed period.

6. The method as claimed in claim 1, wherein
the air-conditioning function of the motor vehicle is a heating and/or cooling of the motor vehicle.

7. The method as claimed in claim 1, wherein
the communication device is a bidirectional communication device of the motor vehicle, and
the bidirectional communication device communicates with the mobile communication appliance wirelessly over a mobile radio network.

8. The method as claimed in claim 1, wherein
the mobile communication appliance is a smartphone, a tablet PC, a laptop computer or a personal digital assistant (PDA).

9. The method as claimed in claim 1, wherein
the activation signal serves as a direct trigger for transmission of the piece of information.

10. The method as claimed in claim 1, wherein
the current position of the motor vehicle is displayed to the user by representing the current position of the motor vehicle in a geographic map or road map, on the display device of the mobile communication appliance.

11. The method as claimed in claim 1, wherein
if the motor vehicle has not been used within a predetermined time period after the air-conditioning function of the motor vehicle has been activated, the mobile communication appliance outputs a reminder signal to the user.

12. A non-transitory readable storage medium storing computer program, which when executed on a mobile communication appliance, causes the mobile communication appliance to perform a method for activating an air-conditioning function of a motor vehicle, the method comprising:
   prompting the mobile communication appliance to send an activation signal for requesting a piece of information about a position of the motor vehicle, the activation signal being sent to a reception device of the motor vehicle;
   after the piece of information about the position of the motor vehicle is received, prompting the mobile communication appliance to display the position of the motor vehicle to a user on a display device of the mobile communication appliance and to take satisfaction of a predetermined criterion for the position as a basis for sending a confirmation signal for activating the air-conditioning function to the reception device of the motor vehicle, the confirmation signal being different from the activation signal.

13. The storage medium as claimed in claim 12, wherein
the predetermined criterion is receipt of an input from the user after the position of the motor vehicle has been displayed.

* * * * *